United States Patent [19]

Mihara

[11] Patent Number: 5,838,113
[45] Date of Patent: Nov. 17, 1998

[54] POWER SUPPLY CIRCUIT EMPLOYING A DIFFERENTIAL AMPLIFIER CONNECTED TO AN AND GATE THAT IS IN TURN CONNECTED TO FLIP-FLOP

[75] Inventor: Masaaki Mihara, Chiba, Japan

[73] Assignee: SGS-Thomson Microelectronics K.K., Tokyo, Japan

[21] Appl. No.: 608,183

[22] Filed: Feb. 28, 1996

[30] Foreign Application Priority Data

Feb. 28, 1995 [JP] Japan .................................. 7-040294

[51] Int. Cl.⁶ .................................................. H05B 37/02
[52] U.S. Cl. ...................... 315/169.3; 315/276; 315/219; 315/224; 315/307
[58] Field of Search ................. 315/169.3, 276, 315/219, 224, 307

[56] References Cited

U.S. PATENT DOCUMENTS

| | | | |
|---|---|---|---|
| 2,683,241 | 7/1954 | Passmore | 315/276 |
| 3,749,977 | 7/1973 | Sliker | 315/169.3 |
| 4,319,164 | 3/1982 | Tulleners | 315/169.3 |
| 4,633,141 | 12/1986 | Weber | 315/169.3 |
| 5,493,183 | 2/1996 | Kimball | 315/158 |

*Primary Examiner*—Robert J. Pascal
*Assistant Examiner*—Michael Shingleton
*Attorney, Agent, or Firm*—David V. Carlson; Robert Iannucci; Seed and Berry LLP

[57] ABSTRACT

A power supply circuit for driving a capacitive load includes a driving pulse generation circuit that generates a driving pulse of a specified frequency, a single drive circuit that is controlled by this driving pulse, and an autotransformer, where a center tap is connected to a source voltage, and forms a resonant circuit by using an autotransformer and a capacitive load, which is connected thereto. Alternatively, instead of driving pulse generation circuit, it includes a differential amplifier and a positive feedback path that performs positive feedback from one of the terminals of the autotransformer to the input terminal of the differential amplifier. In this manner, by driving the autotransformer using the single drive circuit, the entire autotransformer can be utilized in an efficient manner and a smaller and cheaper power supply circuit can be realized.

7 Claims, 2 Drawing Sheets

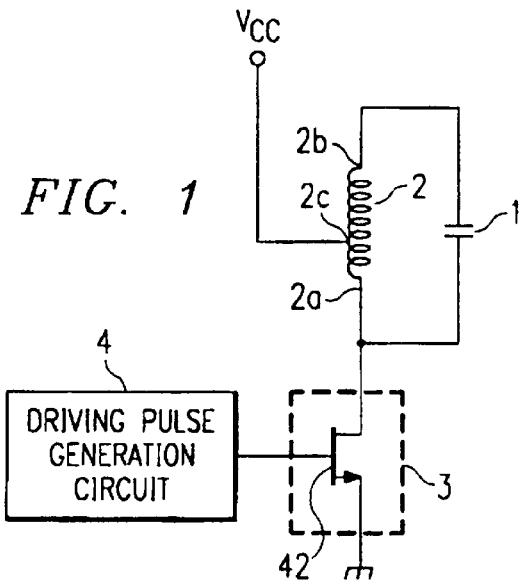
FIG. 1
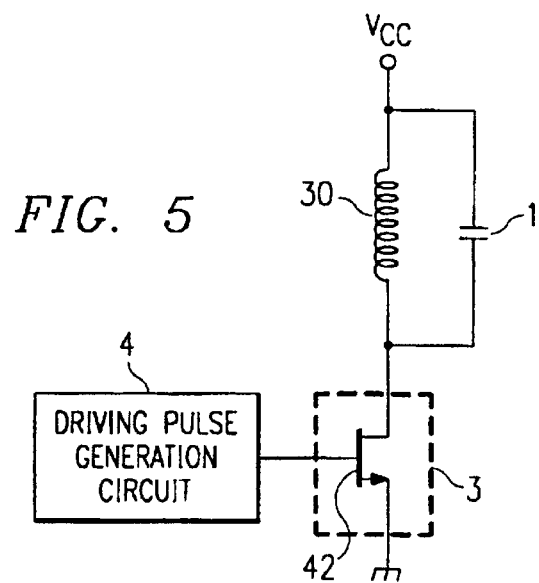
FIG. 5
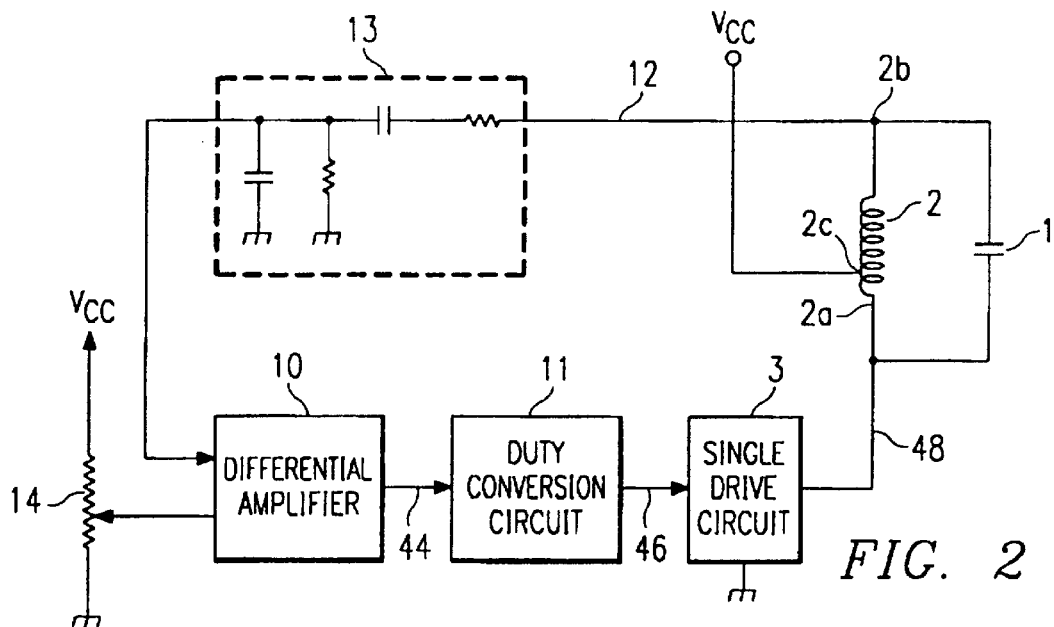
FIG. 2
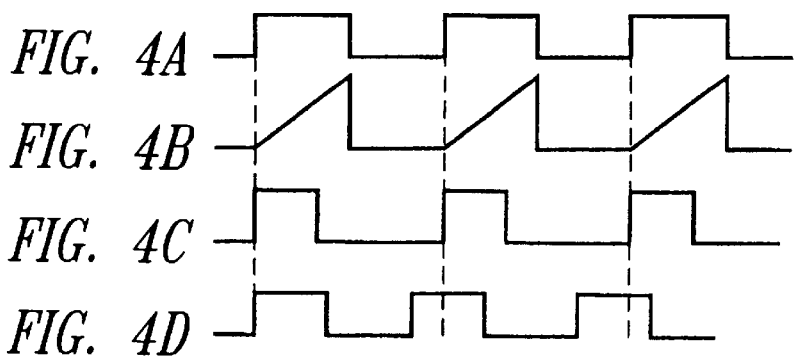
FIG. 4A
FIG. 4B
FIG. 4C
FIG. 4D 5,838,113

POWER SUPPLY CIRCUIT EMPLOYING A DIFFERENTIAL AMPLIFIER CONNECTED TO AN AND GATE THAT IS IN TURN CONNECTED TO FLIP-FLOP

TECHNICAL FIELD

The present invention relates to a power supply circuit, in particular, to a power supply circuit for driving the capacitive loads of electroluminescent panels used in flat panel displays.

BACKGROUND OF THE INVENTION

An electroluminescent panel is used as a flat panel display in many products. One common use is in a wristwatch. The power for driving the electroluminescent panel in a wristwatch is provided by a battery. A DC voltage must be converted into an AC voltage, which is then applied to the electroluminescent panel. However, it is necessary to maintain the frequency of this AC voltage at several hundred hertz and the peak-to-peak value of this AC voltage at several hundred volts because of the characteristics of the electroluminescent panel.

Existing power circuits that use the charging and discharging of a capacitor, in a circuit with an inductor, have been proposed as a power supply circuit for generating an AC voltage of several hundred volts from a DC voltage of tens of volts for use as described above. They are described in U.S. Pat. Nos. 4,208,869; 4,775,964; and 4,527,096.

Some existing power supply circuits for electroluminescent panels that use the charging and discharging of a capacitor, and power supply circuits used for electroluminescent panels that use an inductor, generate rectangular waves. Therefore, they have the disadvantage of a low luminous efficiency at the electroluminescent panel as well as the generation of a large amount of noise.

In order to correct this disadvantage, a power supply circuit for electroluminescent panels using a transformer has been developed. The electroluminescent panel, which is a capacitive load, forms a resonance circuit, in the power supply circuit using a transformer, and an AC voltage with a rectangular waveform is applied to the electroluminescent panel. This power supply circuit has the advantages of reduced noise generation and high luminous efficiency.

However, the size of a transformer having a primary winding and a secondary winding is quite large. Therefore, containing the power supply circuit inside the housing of a wristwatch is difficult. Furthermore, the cost of the transformer is high, so increased cost of the entire power supply circuit presents another problem. Also, in order to emit a relatively large electroluminescence, it is necessary to increase the capacity of the transformer, and the transformer consequently becomes larger and heavier. Therefore, power supply circuits for electroluminescent panels of the type that use transformers are only used today in large display panels, and they cannot be used in small-size applications, such as wristwatches.

SUMMARY OF THE INVENTION

An object of the present invention is to provide a small, lightweight, and low cost power supply circuit for driving capacitive loads. Another object of the invention is to provide a power supply circuit which allows electroluminescent panels to emit light with high efficiency without generating noise.

The power supply circuit of this invention attains these and other objects. The power supply circuit of the present invention has a power supply terminal that is connected to a DC power supply. An autotransformer has first and second terminals as well as a center tap positioned between the first and second terminals, with the center tap connected to the power supply terminal and a capacitive load connected between the first and second terminals. A driving pulse generation circuit generates a driving pulse with a frequency that is equal to the resonant frequency determined by capacitance of the capacitive load and inductance of the autotransformer. A single drive circuit has a switching element, whose output terminal is connected to the first or second terminal of the autotransformer and which performs an on/off operation responsive to the driving pulse supplied from the driving pulse generation circuit.

An autotransformer, which is also called a single-winding transformer, is used in a power supply circuit of the present invention. Compared to an ordinary transformer, which has a secondary winding, its manufacture is extremely simple, it can be made much cheaper, and, in addition, it can be made smaller in size. Therefore, in comparison with conventional power supply circuits using transformers, the power supply circuit of the present invention can be made smaller, lighter, and cheaper. Furthermore, because the resonance circuit is made up of an autotransformer and a capacitive load, the waveform of the output voltage that drives the load is sinusoidal. The use of a sine wave generates less noise and can particularly improve the luminous efficiency when an electroluminescent panel is used as a load.

A single drive circuit is used as the driving circuit of the autotransformer in the present invention. This single drive circuit has a switching element that is alternately brought in an off state and an on state. A driving current is supplied by this switching element from a DC power supply to a portion of the coil section of the autotransformer, for example, in which the number of turns is around 5% of the number of turns of the entire autotransformer. A ringing current is generated in the resonance circuit of the autotransformer and electroluminescent panel, and an AC voltage is applied to the electroluminescent panel. If the frequency of the driving current supplied to the autotransformer is equal to the resonance frequency determined by the inductance of the autotransformer and the capacitance of the electroluminescent panel, then electric power can be efficiently supplied to the electroluminescent panel and the luminous efficiency of the electroluminescent panel increases. In this manner, because the entire coil is efficiently utilized in each driving period by driving the autotransformer using a single drive circuit, the number of turns in the autotransformer can be decreased, and a smaller and cheaper autotransformer can be used. For example, because only half of the coil is used in each driving period in which the autotransformer is driven by a single drive circuit, the number of turns in the autotransformer can be cut approximately in half compared to an autotransformer driven by a push-pull driving circuit.

The ratio of the number of turns between the first terminal and the center tap to the number of turns between the second terminal and the center tap of the autotransformer can be determined based on factors such as the voltage of the DC voltage source, the voltage of the AC voltage output, or the necessary luminance of the electroluminescent panel. The voltage that is applied to the electroluminescent panel can be adjusted based on the duty factor of the driving pulse that drives the single drive circuit and, for this reason, the luminance of the electroluminescent panel can be easily adjusted based on a duty factor adjustment means in the driving pulse generation circuit.

A self-excitation power supply circuit can be one embodiment of the power supply circuit of the present invention. A self-excitation power supply circuit has a power supply terminal that is connected to a DC power supply; a differential amplifier that has first and second input terminals, and an output terminal; a means for applying a reference potential to the second input terminal of the differential amplifier; a single drive circuit having a switching element that is driven by the output signal of the differential amplifier and alternately performs an on/off operation; an autotransformer that has first and second terminals, as well as a center tap placed between the first and second terminals, with the center tap connected to the DC power supply, the first terminal connected to the output terminal of the single drive circuit and a capacitive load connected between the first and second terminals; and a positive feedback path that links the second terminal of the autotransformer to the first input terminal of the differential amplifier.

The capacitance of the electroluminescent panel decreases with time, but in this case the resonance frequency of the resonance circuit increases. For this reason, when self-excitation power supply circuits are used, even if capacitance of the panel changes with time, luminance does not change and can be kept substantially unchanged.

An application of a self-excitation power supply circuit includes a duty factor conversion circuit that is connected between the differential amplifier and the single drive circuit, and which automatically changes the duty factor of the driving signal for the single drive circuit in accordance with the resonance frequency determined by the inductance of the autotransformer and the capacitance of the capacitive load. If the capacitance of the load varies, energy appropriate for a given load can be supplied in accordance with the state of the load. In other words, when an electroluminescent panel is used as a load and the electroluminescent panel deteriorates with time, its capacitance decreases, and the resonance frequency determined by the capacitance of the load and the inductance of the autotransformer increases. However, because the pulse width of the driving pulse used for the single drive circuit is kept unchanged at all times, the duty factor of the driving signal becomes higher to the same extent. As a result, in terms of luminance, the deterioration of the electroluminescent panel with time can be automatically compensated. By using such a construction, appropriate energy can be automatically supplied in accordance with the condition of the load without detecting changes in the condition of the load.

The power supply circuit of the present invention has a power supply terminal that is connected to a DC power supply; a coil that has first and second terminals, with the first terminal connected to the power supply terminal and an electroluminescent panel connected between the first and second terminals; a driving pulse generation circuit for generating a driving pulse with a frequency that is equal to the resonant frequency determined by capacitance of the electroluminescent panel and inductance of the coil; and a single drive circuit having a switching element that alternately performs an on/off operation based on the driving pulse supplied from the driving pulse generation circuit after output terminal is connected to the second terminal.

In the present invention a coil is used as a driving element that drives the electroluminescent panel, and this coil is connected between the power supply terminal and the single drive circuit. The single drive circuit is in an on state when the driving pulse is supplied from the driving pulse generation circuit, and while it is on, energy is supplied to the coil from the power supply terminal. When the driving pulse ends, the single drive circuit is turned off. By using the energy stored in the coil, a sinusoidal voltage is applied to the electroluminescent panel, and the electroluminescent panel starts a generation operation. Although the generated luminance of the electroluminescent panel is determined mainly by the frequency and voltage applied to the pulses, a desired voltage can be applied to the electroluminescent panel and a desired luminance can be obtained by appropriately selecting the resistance and the inductance of the coil as well as the duty factor of the driving pulse. By selecting the frequency of the driving pulse supplied from the driving pulse generation circuit to be substantially the resonance frequency determined by the capacitance of the electroluminescent panel and the inductance of the coil, the electroluminescent panel can be caused to emit light in a highly efficient manner.

The present application represents an improvement on the invention described in U.S. application Ser. Nos. 08/572,118 and 08/572,664, filed on Dec. 14, 1995, incorporated herein by reference. Also incorporated herein by reference are Japanese Patent Application Nos. 6-310,564; 6-310,565; and 7-40,294.

BRIEF DESCRIPTION OF THE DRAWINGS

FIG. 1 is a circuit diagram showing a separate excitation type of power supply circuit according to the present invention;

FIG. 2 is a block diagram showing a self-excitation type of power supply circuit according to the present invention;

FIG. 4 is a waveform diagram explaining the duty control of the duty conversion circuit; and FIG. 5 is a circuit diagram showing an alternative embodiment of the power supply circuit of the present invention.

DETAILED DESCRIPTION OF THE INVENTION

Figure 3:
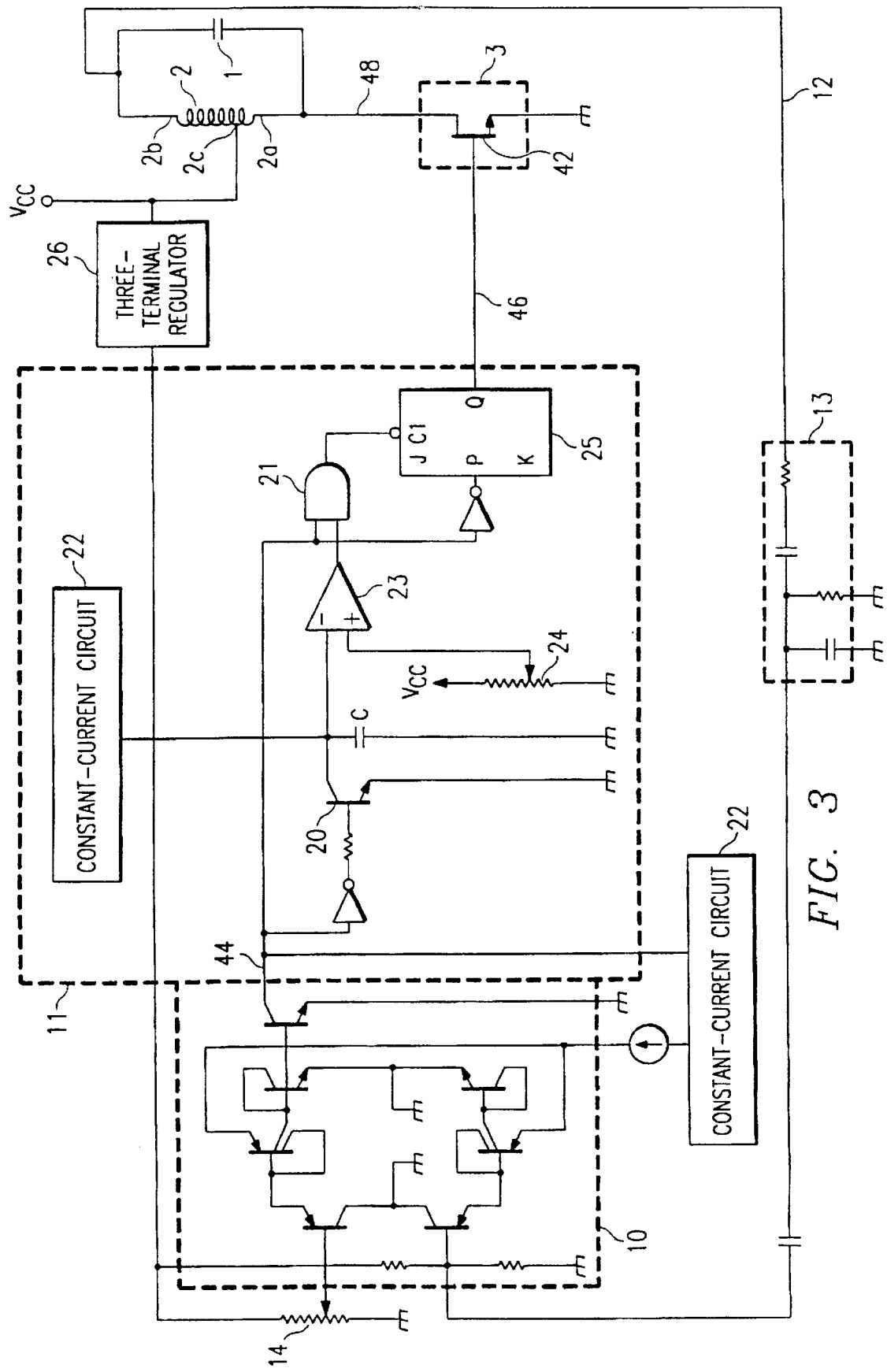
FIG. 3 is a detailed circuit diagram of the circuit shown in FIG. 2.

FIG. 1 is a circuit diagram showing an example of a power supply circuit of the present invention. In the present example, a separate excitation type power supply circuit uses an electroluminescent panel as a capacitive load. An electroluminescent panel 1 is connected between two terminals 2a, 2b of an autotransformer 2. A center tap 2c of autotransformer 2 is connected to a power supply terminal Vcc, which is connected to the cathode of a DC power supply. One of the terminals 2a of the autotransformer is connected to the output terminal of a single drive circuit 3. In the embodiment of FIG. 1, the single drive circuit 3 includes a power MOSFET 42. The drain of a power MOSFET 42 is coupled to the output of the drive circuit 3 and its source is grounded. The gate of the power MOSFET is connected to a driving pulse generation circuit 4. The frequency of the driving pulse generated by the driving pulse generation circuit 4 is selected to approximately equal to the resonance frequency of the resonance circuit made up of autotransformer 2 and electroluminescent panel 1.

The power MOSFET 42 is alternately put in an on state and an off state by the driving pulse supplied from driving pulse circuit 4 and, as a result, a sinusoidal AC voltage is applied to electroluminescent panel 1 by the driving current supplied to the autotransformer from power supply terminal Vcc. The ratio of the number of turns between center tap 2c and first terminal 2a to the number of turns between center tap 2c and second terminal 2b of autotransformer 2 can be determined based on factors such as the capacitance of and the desired amount of emission from the electroluminescent panel, the voltage applied, or the voltage of the DC power supply. For example, it can be set to about 1:20.

For example, when DC voltage Vcc is approximately 6 V, the capacitance of electroluminescent panel 1 is approximately 4000 pF, the inductance of autotransformer 2 is approximately 112 mH, the ratio of the number of turns is approximately 1:20, and the frequency of the driving pulse is approximately 7.5 kHz, an AC voltage of approximately 150 V can be applied to the electroluminescent panel in the power supply circuit shown in FIG. 1.

The AC voltage applied to electroluminescent panel 1 in the power supply circuit shown in FIG. 1 can be varied by providing a variable duty circuit in driving pulse generation circuit 4 for changing the duty factor of the driving pulse supplied to single drive circuit 3. Therefore, the voltage applied can be varied in accordance with the desired emission from electroluminescent panel 1 and the capacitance of the electroluminescent panel.

FIG. 2 is a block diagram of an embodiment of a self-excitation power supply circuit of the present invention. The power supply circuit is equipped with a differential amplifier 10, a duty conversion circuit 11, a single drive circuit 3, an autotransformer 2, and a positive feedback path 12. An output signal is supplied from differential amplifier 10 to an input terminal 44 of duty conversion circuit 11. The duty conversion circuit 11 generates a driving signal that has a duty factor corresponding to changes in the capacitance of the load, and the driving signal is supplied on input terminal 46 to single drive circuit 3. The output terminal 48 of the single drive circuit 3 is connected to the first terminal 2a of autotransformer 2. The center tap 2c of the autotransformer 2 is connected to a positive power supply terminal Vcc, which is connected to the cathode of a DC power supply. An electroluminescent panel 1, which is the load, is connected between the two terminals, 2a and 2b of autotransformer 2. Second terminal 2b of autotransformer 2 is connected to an input terminal of differential amplifier 10 through positive feedback path 12. In the present example, a filter 13 is connected to this positive feedback path 12. However, this filter, which is intended for adjusting the Q of the resonance circuit made up of autotransformer 2 and electroluminescent panel 1 serving as the load, is not necessary and can be eliminated. A feedback path 12 without a filter may be used if desired. Also, the other input terminal of differential amplifier 10 is connected to the tap of a potentiometer 14 connected in series with the DC power supply, so that the desired reference potential is applied thereto and is variable.

In the self-excitation power supply circuit described above, autotransformer 2 and electroluminescent panel 1 make up a parallel resonance circuit. If the inductance of autotransformer 2 and the capacitance of electroluminescent panel 1 are designated as L and C, respectively, then the resonance frequency f of this resonance circuit is expressed by $f=(\frac{1}{2})\pi(L C)^{1/2}$. Here, capacitance C of electroluminescent panel 1 changes with time, and therefore, when the peak-to-peak value of the AC voltage is constant, luminance decreases with time. However, in the present example, when electroluminescent panel 1 deteriorates with time and capacitance C decreases, frequency of the AC voltage becomes higher. This effect on frequency results in maintaining a substantially constant luminance of the electroluminescent panel.

FIG. 3 is a detailed circuit diagram showing an application of the power supply circuit of the present invention shown in FIG. 2. Because differential amplifier 10 is constructed in a conventional manner, explanations regarding it are omitted. The output signal of differential amplifier 10 is supplied to duty conversion circuit 11. The input terminal 44 of duty conversion circuit 11 is connected to the base of transistor 20 through branches of resistors and inductors, and is connected to one of the input terminals of AND gate 21. The emitter of transistor 20 is grounded, and its collector is connected to a node between constant-current circuit 22 and capacitor C, with this node connected to the inverting input of differential amplifier 23. Differential amplifier 23 acts as a comparator, and its noninverting input is connected to a potentiometer 24, providing bias to a reference potential Vref. Therefore, the voltage between the two terminals of capacitor C becomes a signal with a triangular waveform that grows linearly in response to each input signal, and is compared with reference potential Vref of differential amplifier 23. Differential amplifier 23 outputs a signal only in the case in which the voltage between the two terminals of capacitor C is lower than the reference potential Vref, and this output signal is supplied to AND gate 21. The output signal of AND gate 21 is then supplied to a JK flip-flop circuit 25. The signal supplied to this input terminal is further supplied to the P terminal of the JK flip-flop circuit through an inverter 26. The output signal of JK flip-flop circuit 25 is an output signal of duty conversion circuit 11, whose duty is controlled in accordance with the changes in the capacitance of electroluminescent panel 1 in the manner described below, and is supplied to the input terminal of single drive circuit 3.

Single drive circuit 3 is made up of a power MOSFET 42, with its gate connected to the signal output terminal of JK flip-flop circuit 25. The drain of the power MOSFET 42 is connected to first terminal 2a of autotransformer 2, and the source is grounded. Center tap 2c of autotransformer 2 is connected to DC power supply Vcc, and electroluminescent panel 1 is connected between first terminal 2a and second terminal 2b.

In order to obtain a driving voltage of, for example, 5 V for differential amplifier 10 and duty conversion circuit 11, a three-terminal regulator 26 is connected to the DC power supply. The output of the regulator 26 provides operational power to the circuit elements, though the connection is not shown because it is standard in the art. Also, in order to obtain the reference potential applied to the negative input terminal of differential amplifier 10, a potentiometer 14 is connected to the 5-V output terminal of three-terminal regulator 26, with its tap connected to the negative input terminal of differential amplifier 10. Therefore, an optimal reference potential can be obtained by adjusting the position of the tap of potentiometer 14. In this manner, a sinusoidal AC voltage with a peak-to-peak value of approximately 150 V and a frequency of approximately 7.5 kHz can be applied to the electroluminescent panel from a 6-V DC power supply.

The operation of the duty conversion circuit will now be explained. FIG. 4 shows the waveform of the signals in each part of the duty conversion circuit. FIG. 4(a) shows the waveform of the input signal at the input terminal 44; FIG. 4(b) shows the waveform of the voltage between the two terminals of capacitor C; FIG. 4(c) shows the waveform of the output signal of the JK flip-flop circuit on terminal 46; and FIG. 4(d) shows the waveform on the terminal 46 having the output signal of the JK flip-flop circuit when the capacitance of electroluminescent panel 1 has decreased and the resonance frequency has increased.

As shown in FIG. 4(a), a signal with a 50% duty factor is input to the input terminal 44 of the duty converter. Then, because a constant current is supplied to capacitor C from constant-current circuit 22, the voltage between both terminals of capacitor C assumes the triangular waveform shown in FIG. 4(*b*). Because the voltage between both terminals of capacitor C is compared with reference potential Vref by differential amplifier 23, an output signal with a pulse width having a duty factor of 50% or less, such as 40%, for example, is output from the differential amplifier by appropriately selecting the reference potential. Because the resonance frequency, which is determined by the inductance of the autotransformer and the capacitance of the electroluminescent panel, is fed back through positive feedback path 12, the frequency of the signal supplied to duty conversion circuit 11 becomes higher when the resonance frequency becomes higher. On the other hand, because the pulse width of the signal from differential amplifier 10 is determined based on reference potential Vref of potentiometer 14, a constant pulse width is maintained even if the resonance frequency changes. As a result, the duty factor of the driving signal for single drive circuit 3 becomes higher to the same extent, and the luminance of the electroluminescent panel is automatically compensated.

FIG. 5 shows another application of the power supply circuit of the present invention. In the example of FIG. 5, a coil 30, which has no center tap, is used instead of the autotransformer. An electroluminescent panel 1 is connected between second terminal 30*b* and first terminal 30*a* of coil 30, with first terminal 30*a* connected to DC power supply Vcc and second terminal 30*b* connected to the drain of the power MOSFET of single drive circuit 3. The frequency of the driving pulse supplied from driving pulse generation circuit 4 is approximately equal to the resonance frequency determined by the capacitance of electroluminescent panel 1 and inductance of coil 30. The energy that is stored in coil 30 during the period when the driving pulse is in the on state is discharged while the driving pulse is in the off state, and a sinusoidal voltage is applied to the electroluminescent panel. An appropriate voltage can then be applied to the electroluminescent panel and, therefore, the desired luminance can be obtained by appropriately setting the resistance and the inductance of coil 30, as well as the duty factor of the driving pulse.

The present invention is not limited to the above-described application examples, and various transformations and modifications thereof are possible. For example, a duty conversion circuit is shown placed between the differential amplifier and the single drive circuit in the self-excitation power supply circuit shown in FIGS. 2 and 3. However, this duty conversion circuit is not necessary and can be eliminated in some embodiments.

Also, the single drive circuit 3 can be constructed from any acceptable switching circuit that can allow current to flow or block current flow, such as bipolar transistors, an SCR, and other switching circuits.

As explained above, an autotransformer is driven using a single drive circuit in the present invention, so the entire winding of the autotransformer is constantly in use. As a result, the autotransformer can be made smaller in size; therefore, the power supply circuit can be made smaller. In particular, the number of turns in the autotransformer can be cut in half as compared with a system in which the autotransformer is driven by a push-pull circuit.

Furthermore, the circuit provides the advantage that in the case of a power supply circuit of the self-excitation type, even if the capacitance of the electroluminescent panel serving as the load deteriorates with time and becomes lower, luminance compensation is performed. In particular, luminance compensation is done automatically without detecting the state of the load by providing a duty conversion circuit.

While various embodiments have been described in this application for illustrative purposes, the claims are not so limited. Rather, any equivalent device operating according to principles of the invention falls within the scope thereof.

I claim:

1. A power supply circuit comprising:
   a power supply terminal connected to a DC power supply;
   an autotransformer that has first and second terminals and a tap positioned between the first and second terminals, the tap being connected to the power supply terminal;
   a capacitive load connected between the first and second terminals;
   a driving pulse generation circuit for generating a driving pulse with a frequency that is substantially equal to a resonance frequency determined by capacitance of said capacitive load and inductance of said autotransformer, the driving pulse generation circuit including a duty factor conversion circuit having an input and an output, the input being coupled by a feedback path to the inductor coil and the electroluminescent panel, the duty factor conversion circuit being structured to provide at its output the driving pulse with a duty factor and a frequency that both automatically changes in accordance with the resonance frequency wherein the duty factor correction circuit includes:
      a capacitor coupled between a constant current circuit and a first reference potential such that the capacitor has a capacitor voltage waveform that is triangular:
      a first differential amplifier having a first input coupled to the capacitor a second input coupled to a second reference potential, and an output at which an output signal is proportional to a difference between the capacitor voltage waveform and the second reference potential;
      an AND gate having a first input coupled by the feedback path to the capacitive load, a second input coupled to the output of the first differential amplifier, and an output; and
      a flip-flop having an input and an output, the input being coupled to the output of the AND gate; and
   a single drive circuit having a switching element with an output terminal connected to one of the first and second terminals of said autotransformer and an input terminal coupled to the output of the flip-flop, said single drive circuit alternately performing an on/off operation responsive to the driving pulse supplied from said driving pulse generation circuit.

2. The power supply circuit according to claim 1 wherein the reference voltage is selected to generate a frequency substantially equal to the resonant frequency determined by the capacitance of said capacitive load and the inductance of said autotransformer.

3. The power supply circuit of claim 1 wherein the switching element comprises a power MOS transistor.

4. The power supply circuit of claim 1, further including a second differential amplifier having first and second inputs and an output, the first input being connected to a reference voltage, the second input being connected to the first terminal of the autotransformer, and the output being connected to the input terminal of the driving pulse generation circuit.

5. A power supply circuit comprising:
   a power supply terminal connected to a DC power supply;
   an inductor coil that has first and second terminals, the first terminal being connected to said power supply terminal;

an electroluminescent panel connected between the first and second terminals of the inductor coil;

a driving pulse generation circuit for generating a driving pulse with a frequency that is substantially equal to a resonance frequency determined by capacitance of the electroluminescent panel and inductance of said coil, the driving pulse generation circuit including a duty factor conversion circuit having an input coupled by a feedback path to the inductor coil and the electroluminescent panel and an output, the duty factor conversion circuit being structured to provide at its output the driving pulse with a duty factor and a frequency that both automatically changes in accordance with the resonance frequency; and a switching element for performing an on/off operation responsive to the driving pulse supplied from said driving pulse generation circuit, wherein the duty factor correction circuit includes:

a capacitor coupled between a constant current circuit and a first reference potential such that the capacitor has a capacitor voltage waveform that is triangular;

a first differential amplifier having a first input coupled to the capacitor, a second input coupled to a second reference potential, and an output at which an output signal is proportional to a difference between the capacitor voltage waveform and the second reference potential;

an AND gate having a first input coupled by the feedback path to the electroluminescent lamp, a second input coupled to the output of the first differential amplifier, and an output; and a flip-flop having an input coupled to the output of the AND gate and an output coupled to the switching element such that the duty factor and frequency of the driving signal depends on the resonance frequency.

6. A power supply circuit comprising:

a power supply terminal connected to a DC power supply;

a first differential amplifier having first and second input terminals and an output terminal, the first differential amplifier being structured to produce at the output terminal an output signal indicative of a difference between a feedback signal received at the first input terminal and a first reference potential received at the second input terminal;

a single drive circuit having a switching element for performing an on/off operation in response to the output signal of said first differential amplifier;

an autotransformer that has first and second terminals and a tap placed between the first and second terminals, the tap being connected to the DC power supply, the first terminal being connected to the output terminal of said single drive circuit;

a capacitive load connected between the first and second terminals;

a positive feedback path that couples the second terminal of said autotransformer to the first input terminal of said first differential amplifier and supplies the feedback signal to the first input terminal; and a duty factor conversion circuit having an input coupled to the output terminal of the first differential amplifier and an output coupled to the single drive circuit, the duty factor conversion circuit being structured to provide at its output a driving signal with a duty factor and automatically change the duty factor of the driving signal for said single drive circuit in accordance with a resonance frequency determined by inductance of said autotransformer and capacitance of said capacitive load, wherein the duty factor correction circuit includes:

a capacitor coupled between a constant current circuit and a second reference potential such that the capacitor has a capacitor voltage waveform that is triangular;

a second differential amplifier having a first input coupled to the capacitor, a second input coupled to a third reference potential, and an output at which an output signal is proportional to a difference between the capacitor voltage waveform and the third reference potential;

an AND gate having a first input coupled to the output terminal of the first differential amplifier a second input coupled to the output of the second differential amplifier, and an output; and a flip-flop having an input coupled to the output of the AND gate and an output coupled to the single drive circuit such that the duty factor and frequency of the driving signal depends on the resonance frequency.

7. The power supply circuit of claim 5, further comprising a second differential amplifier having first and second input terminals and an output terminal, the second differential amplifier being structured to produce at the output terminal an output signal indicative of a difference between a feedback signal received from the electroluminescent lamp at the first input terminal and a third reference potential received at the second input terminal.

* * * * *